(12) United States Patent  
Yatsuki

(10) Patent No.: US 8,055,853 B2  
(45) Date of Patent: Nov. 8, 2011

(54) DATA STORAGE SYSTEM AND DATA STORAGE PROGRAM FOR ATOMIC TRANSACTIONS

(75) Inventor: Shuji Yatsuki, Kyoto (JP)

(73) Assignee: Kyoto Software Research, Inc., Kyoto (JP)

( * ) Notice: Subject to any disclaimer, the term of this patent is extended or adjusted under 35 U.S.C. 154(b) by 294 days.

(21) Appl. No.: 12/514,289

(22) PCT Filed: Nov. 4, 2008

(86) PCT No.: PCT/JP2008/070038  
§ 371 (c)(1),  
(2), (4) Date: May 8, 2009

(87) PCT Pub. No.: WO2009/069436  
PCT Pub. Date: Jun. 4, 2009

(65) Prior Publication Data  
US 2011/0022813 A1 Jan. 27, 2011

(30) Foreign Application Priority Data

Nov. 28, 2007 (JP) .................................. 2007-307639

(51) Int. Cl.  
*G06F 12/00* (2006.01)
(52) U.S. Cl. .................... 711/147; 711/148; 711/150
(58) Field of Classification Search .................. 711/150  
See application file for complete search history.

(56) References Cited

U.S. PATENT DOCUMENTS

| 5,414,840 | A | 5/1995 | Rengarajan et al. |
| 7,257,690 | B1* | 8/2007 | Baird .............................. 711/162 |
| 2004/0083348 | A1* | 4/2004 | Chang et al. .................. 711/202 |
| 2004/0103241 | A1* | 5/2004 | Chang et al. .................. 711/103 |
| 2006/0069885 | A1 | 3/2006 | Matsui et al. |

FOREIGN PATENT DOCUMENTS

| EP | 1 612 700 A2 | 1/2006 |
| JP | 7175700 A | 7/1995 |
| JP | 2006012153 A | 1/2006 |
| JP | 2006106868 A | 4/2006 |

OTHER PUBLICATIONS

Extended European Search Report for corresponding European Patent Application No. 08854486.1—1245 / 2216721, pp. 1-8, Jan. 25, 2011.

* cited by examiner

*Primary Examiner* — Reginald Bragdon  
*Assistant Examiner* — Gurtej Bansal  
(74) *Attorney, Agent, or Firm* — Ditthavong Mori & Steiner, P.C.

(57) ABSTRACT

Atomic data are stored in blocks on a hard disk. The blocks are grouped into a committed block aggregate P1, which exists only on the hard disk, a next-generation committed block aggregate C1, which is converted into a committed block aggregate at predetermined times, and an atomic block aggregate S3, which is created for every user based on the committed block aggregate C1. User A makes desired data changes to S3. When user A terminates the data processing, the block aggregate storing the data is merged, like from the atomic block aggregate S4 to committed block aggregate C2, and stored on the hard disk as a committed block aggregate P3.

8 Claims, 17 Drawing Sheets

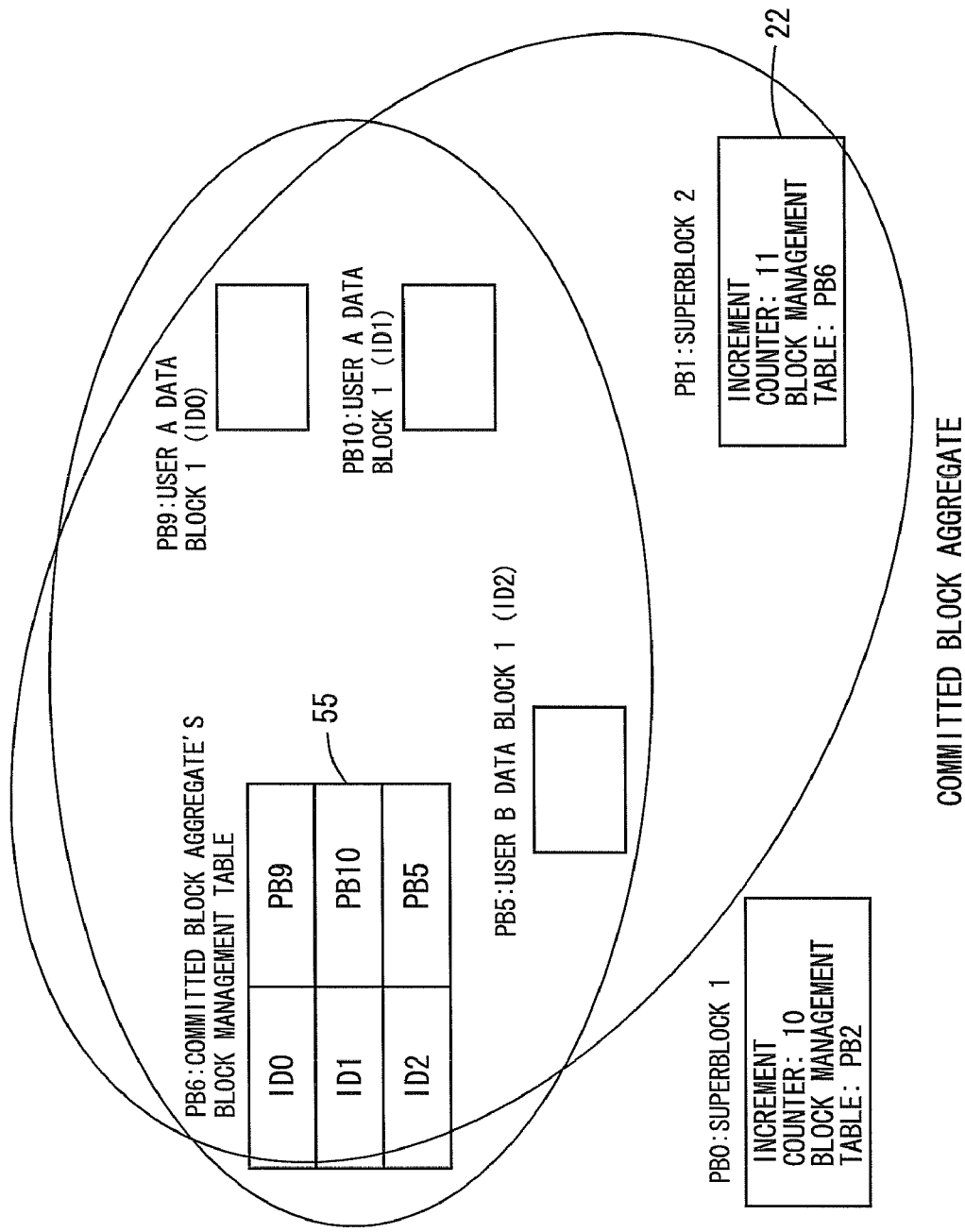

DATA STORAGE SYSTEM AND DATA STORAGE PROGRAM FOR ATOMIC TRANSACTIONS

TECHNICAL FIELD

This invention relates to a data storage system and data storage program enabling atomic transactions (which are transactions that cannot be committed partially and have to be implemented either fully or not at all).

BACKGROUND ART

A conventional data storage system enabling atomic transactions is disclosed in Japanese unexamined patent publication No. 2006-106868. This publication discloses that there are a log based scheme and a side-file based scheme in file management systems and the disadvantages of the shadow page technique used in the side-file based scheme and also discloses a file system capable of overcoming the disadvantages.

Many conventional atomic data storage systems have been structured like the file system in the disclosure. The publication mentions that the file system adopting the log based scheme is more advantageous; however, such a log based file system is expensive. In addition, the conventional file systems generally use a nonvolatile storage medium, such as a hard disk, to which a plurality of users access. While the users are using different files in the nonvolatile storage medium, if a user commits a file, the other files being processed by the other users could be occasionally committed in sync with the committed file. This situation causes unwanted data of the individual users to be stored upon a power failure, for example, which means one user can be affected by processing operations by the other users.

DISCLOSURE OF THE INVENTION

This invention was made to solve the above-mentioned problems and has an object to provide a data storage system and data storage program enabling atomic transactions and in which each user is not affected by data processing performed by the other users.

The data storage system according to the present invention is a data storage system designed for a nonvolatile storage medium storing data accessible by a plurality of users. The data are held in predetermined blocks. While one of the users is processing data in a block, the other users cannot process the data in the block. The predetermined blocks include separately provided committed blocks, next-generation committed blocks and atomic blocks. The committed blocks, next-generation committed blocks and atomic blocks are grouped into a committed block aggregate, a next-generation committed block aggregate and an atomic block aggregate, respectively; each of the aggregates being a collection of the blocks. The committed block aggregate exists only on the nonvolatile storage medium. The data storage system comprises: first block formation means that forms the next-generation committed block aggregate, which can exist across the nonvolatile storage medium and another storage medium, from the committed block aggregate by copying some blocks of the committed block aggregate; second block formation means that forms the atomic block aggregate, for every user, which can exist across the nonvolatile storage medium and another storage medium, from the next-generation committed block by copying some blocks of the next-generation committed block aggregate; block operation acceptance means that accepts operations for atomic block aggregates to be performed on the atomic block aggregate created for every user by the second block formation means; merge means that merges the atomic block aggregate being completely subjected to the operations by the block operation acceptance means with the next-generation committed block aggregate while maintaining atomicity for every user by replacing the blocks revised by the block operation acceptance means with yet-to-be revised blocks in the next-generation committed block aggregate; and transition means that transits the next-generation committed block aggregate merged by the merge means to a committed block aggregate while maintaining the atomicity by writing all blocks existing in the next-generation committed block aggregate but not on the nonvolatile storage medium, onto the nonvolatile storage medium.

The place not on the nonvolatile storage medium includes cache on a RAM, cache provided in part of a CPU and so on.

Preferably, the transition means transits the next-generation committed block aggregate, which was merged with the blocks revised on the plurality of atomic block aggregates by the merge means, to the committed block aggregate.

More preferably, the merge means merges an atomic block aggregate or a plurality of concurrently existing atomic block aggregates to the next-generation committed block aggregate at any time.

The transition means preferably includes atomic block-position determination means that determines the location of the committed block aggregate storing atomic data.

The atomic block-position determination means preferably is a pair of superblocks, each including a block number for identifying block aggregates holding atomic data and an increment counter. Every time atomic data is written in a new block aggregate, one of the pair of the block numbers and the value of the increment counters are preferably updated in sequence.

Each of the superblocks includes a set of a block number and an increment counter. The block number is used to identify block aggregates holding atomic data. The set of the block number, which is used to identify block aggregates holding atomic data, and the increment counter can store the same data.

Each block in the block aggregates includes a block-number management table. The block-number management table stores the relationship between the physical block numbers storing data and block IDs.

The committed block aggregate, next-generation committed block aggregate and atomic block aggregate, each can include a user data block storing changeable data for every user and a block-number management table managing the user data block.

In another aspect of the present invention, a data storage program enables a computer to operate as a data storage system designed for a nonvolatile storage medium storing data accessible by a plurality of users. The data are held in predetermined blocks. While one of the users is processing data in a block, the other users cannot process the data in the block. The predetermined blocks include separately provided committed blocks, next-generation committed blocks and atomic blocks. The committed blocks, next-generation committed blocks and atomic blocks are grouped into a committed block aggregate, a next-generation committed block aggregate and an atomic block aggregate, respectively; each of the aggregates being a collection of blocks. The committed block aggregate exists only on the nonvolatile storage medium. The program enables the data storage system to operate as: first block formation means that forms the next-generation committed block aggregate, which can exist across the nonvolatile storage medium and other storage media, from the committed block aggregate by copying some blocks of the committed block aggregate; second block formation means that forms the atomic block aggregate, for every user, which can exist across the nonvolatile storage medium and another storage medium, from the next-generation committed block by copying some blocks of the next-generation committed block aggregate; block operation acceptance means that accepts operations for atomic block aggregates to be performed on the atomic block aggregate created for every user by the second block formation means; merge means that merges the atomic block aggregate being completely subjected to the operations by the block operation acceptance means with the next-generation committed block aggregate while maintaining atomicity for every user by replacing the blocks revised by the block operation acceptance means with yet-to-be revised block in the next-generation committed block aggregate; and transition means that transits the next-generation committed block aggregate merged by the merge means to a committed block aggregate while maintaining the atomicity by writing all blocks existing in the next-generation committed block aggregate but not on the nonvolatile storage medium, onto the nonvolatile storage medium.

Once the block operations for maintaining atomicity to which the user expects are accepted to be performed on the atomic block aggregate, the atomic block aggregate makes transition to the committed block aggregate while maintaining the atomicity and is committed.

Consequently, the present invention can provide a data storage system, designed for a nonvolatile storage medium, enabling atomic transactions and preventing each user from being affected by data processing performed by the other users.

BRIEF DESCRIPTION OF THE DRAWINGS

FIG. 23 illustrates, in transition of the block aggregates, an exemplary transition of specific physical block numbers.

BEST MODE FOR CARRYING OUT THE INVENTION

Figure 1:
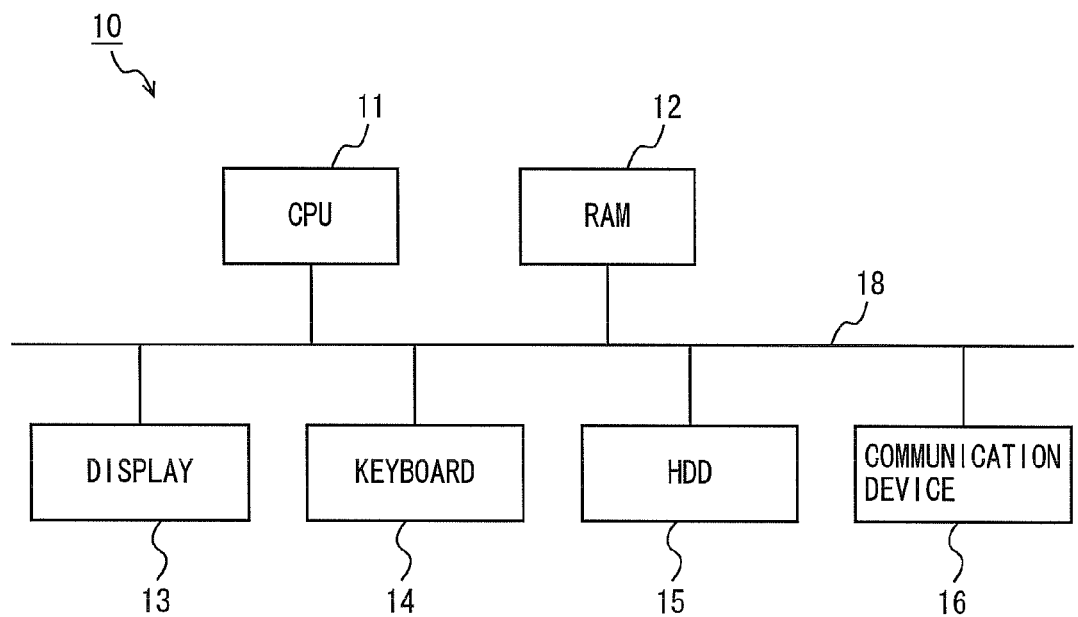
FIG. 1 is a block diagram of a configuration of a computer system to which the data storage system according to the present invention is applied.

With reference to the drawings, an embodiment of the present invention will be described below. FIG. 1 is a block diagram of a configuration of a computer system to which a data storage system according to the present invention is applied. Referring to FIG. 1, the computer system 10 includes a CPU (Central Processing Unit) 11 for controlling the entire system, a RAM (Random Access Memory) 12 connected to the CPU 11 via a bus 18, a display 13, a keyboard 14, a hard disk 15 and a communication device 16. A plurality of users access the hard disk 15 of the computer system from their own computers through the communication device 16.

Figure 2:
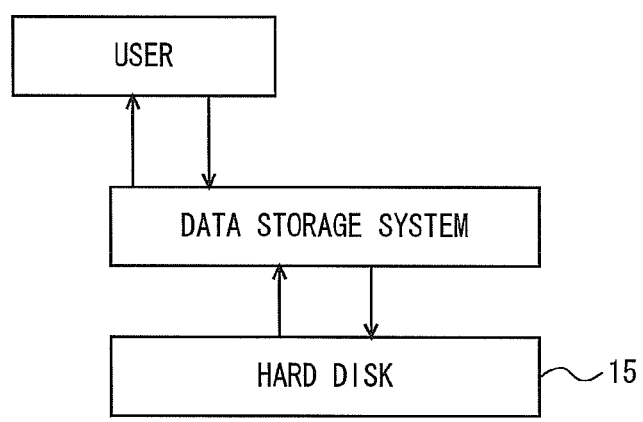
FIG. 2 illustrates the position of the data storage system.

FIG. 2 illustrates the position of the data storage system in this embodiment. Referring to FIG. 2, the data storage system is used by the users to store data on the hard disk 15. With this hard disk 15 the users can read and write (rewrite) data in predetermined bytes. To describe this system, it is supposed that the users store desired data into a plurality of data storage blocks on the hard disk 15.

In this data storage system, data has atomic properties, which means each and every user can close their own files while maintaining atomicity of the files. Note that when a user is processing data in a block, the other users cannot process the data in the block.

The plurality of blocks on the hard disk 15 are guaranteed that unscheduled power failure during a read operation does not affect any block state at all, and unscheduled power failure during a write operation brings a single block, which is the one undergoing the write operation, into an unstable state, but does not affect the other blocks.

Figure 3:
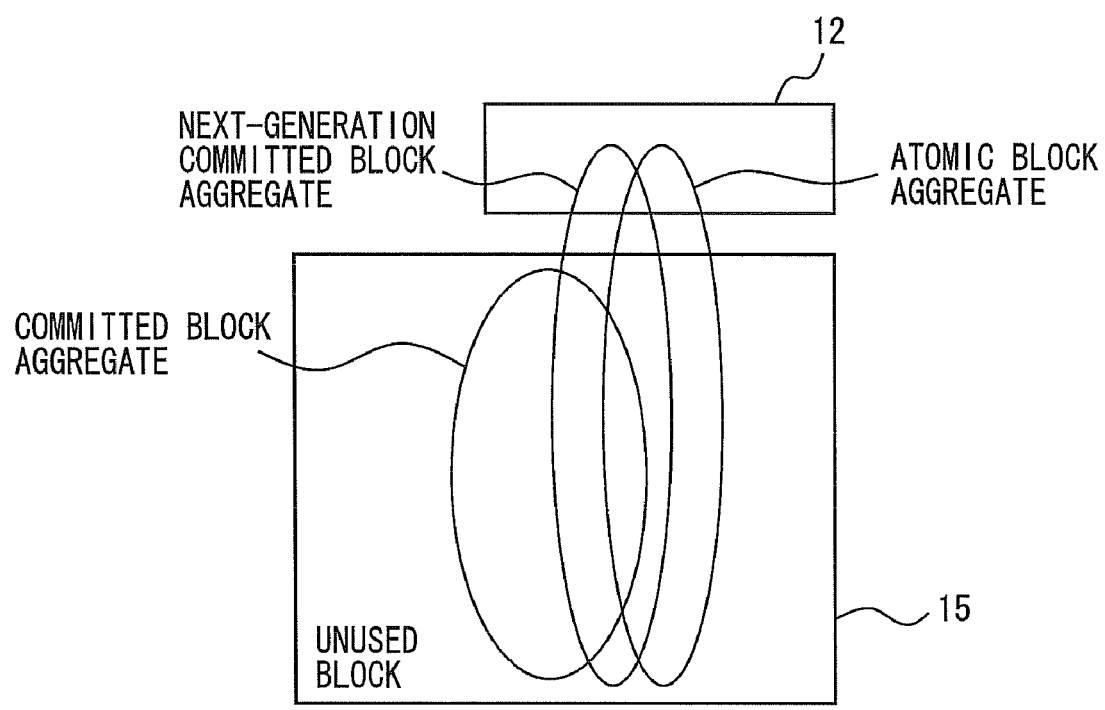
FIG. 3 is a diagram for explaining where aggregates of blocks for storing data are located in the data storage system.

FIG. 3 is a diagram for explaining aggregates of blocks for storing data in the data storage system according to the embodiment. In this embodiment, there are three forms of block aggregates, i.e., a committed block aggregate, a next-generation committed block aggregate and an atomic block aggregate. The committed block aggregate is a consistent block aggregate that uses some blocks on the hard disk 15 and consists of a plurality of user data blocks for storing data meaningful to user And one or more management blocks for managing the user data blocks.

Figure 18:
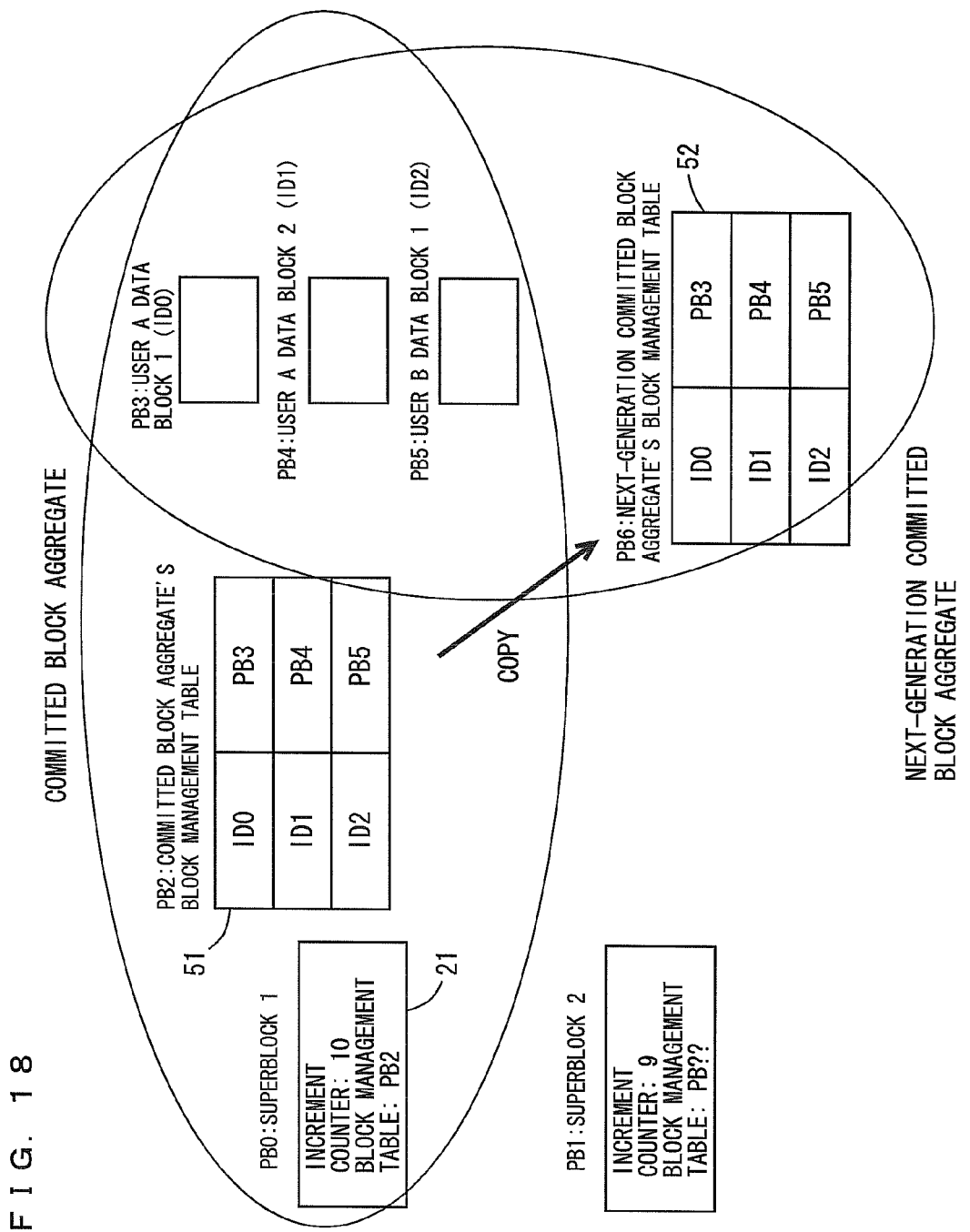
FIG. 18 illustrates, in transition of the block aggregates, an exemplary transition with specific physical block numbers.

A detailed description concerning the user data block and management block will be made later. In brief, an example of the management block is shown in FIG. 18 as a block-number management table stored in a block having a physical block number of PB2, while an example of the user data block is shown as blocks storing user's data each having a physical block number of PB3 and so on.

The next-generation committed block aggregate extends across the hard disk 15 and, for example, the RAM 12, and stores data that is ready to move to the committed block aggregate. The data storage system always has only one next-generation committed block aggregate. In order to maintain consistency of the block aggregates, all blocks included in the committed block aggregate are never overwritten to make revisions, but only the user data block and management block required for the revisions are revised by using the only blocks that are on the hard disk 15 but not included in the committed block aggregate.

The atomic block aggregate extends across the hard disk 15 and RAM 12. The atomic block aggregate, which is associated with a transaction, is branched off from the next-generation committed block aggregate at the start of the transaction and disappears after merging the changes with the next-generation committed block aggregate upon termination of the transaction. There may be a plurality of atomic block aggregates or none.

This block allows one or more user data blocks, which a user expects to atomically process, to be revised by using the blocks located on the hard disk 15 but not included in the committed aggregate and next-generation committed block aggregate and allows the all revised user data blocks to be merged with blocks making up the next-generation committed block aggregate only by correcting the management block in the next-generation committed block aggregate upon termination.

Next, the operations of the CPU 11 in the data storage system will be described. FIGS. 4 to 15 are flow charts showing the operations performed by the CPU 11 that activates the data storage system.

Figure 4:
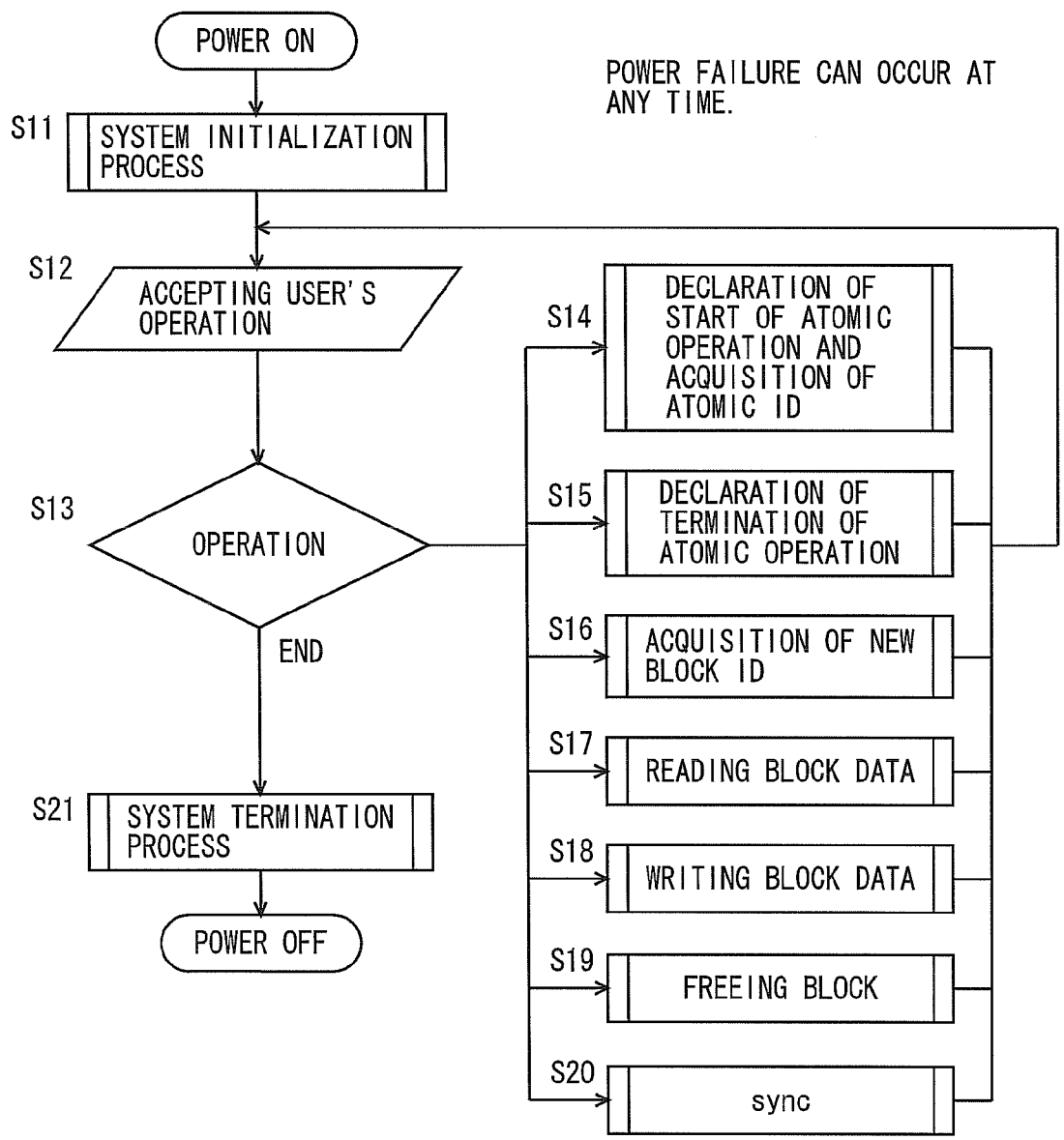
FIG. 4 is a flow chart showing regular processes by the data storage system.

FIG. 4 is a flow chart showing regular processes performed by the data storage system according to the embodiment. Referring to FIG. 4, the system in normal times is initialized at power-up (step S11, hereinafter "step" is omitted), and accepts operations from a user (S12). The operations from the user are performed through the keyboard 14 or the like. The operations by the user can be any operation, including declaration of start of an atomic operation and acquisition of an atomic ID (S14), declaration of termination of the atomic operation (S15), acquisition of a new block ID (S16), reading block data (S17), writing block data (S18), freeing blocks (S19) or synchronization (sync, S20). With completion of these operations, the data storage system performs a termination process (S21) and then is turned off.

The declaration of start of an atomic operation implies that a user starts data processing while maintaining atomicity. Atomic IDs are used to identify users. In this embodiment, blocks storing data are identified with the atomic ID and block ID. The block ID indirectly indicates a physical block number of a block on the hard disk 15.

In this embodiment, the synchronous processing allows the created data or the like to be stored on the hard disk 15 at any time intended by the user.

Figure 5:
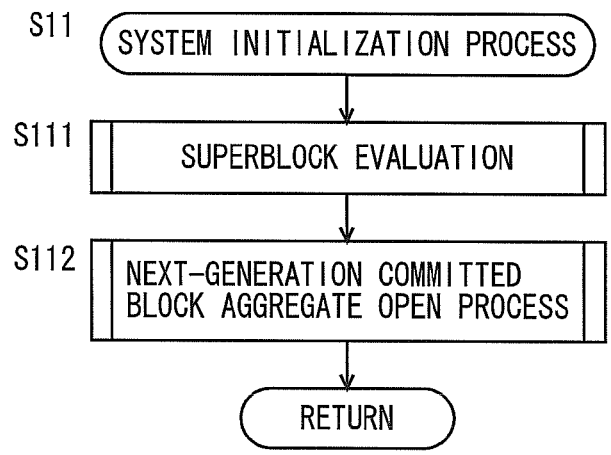
FIG. 5 is a flow chart showing the actual operations of a system initialization process.

Power outage can occur at any time during the plurality of operations concurrently performed by users. The next description will be about the system initialization process shown in S11 of FIG. 4. FIG. 5 is a flow chart showing the actual operations in the system initialization process. Referring to FIG. 5, the system initialization process begins with superblock evaluation (S111) and is followed by an open process for the next-generation committed block aggregate (S112).

Figure 16:
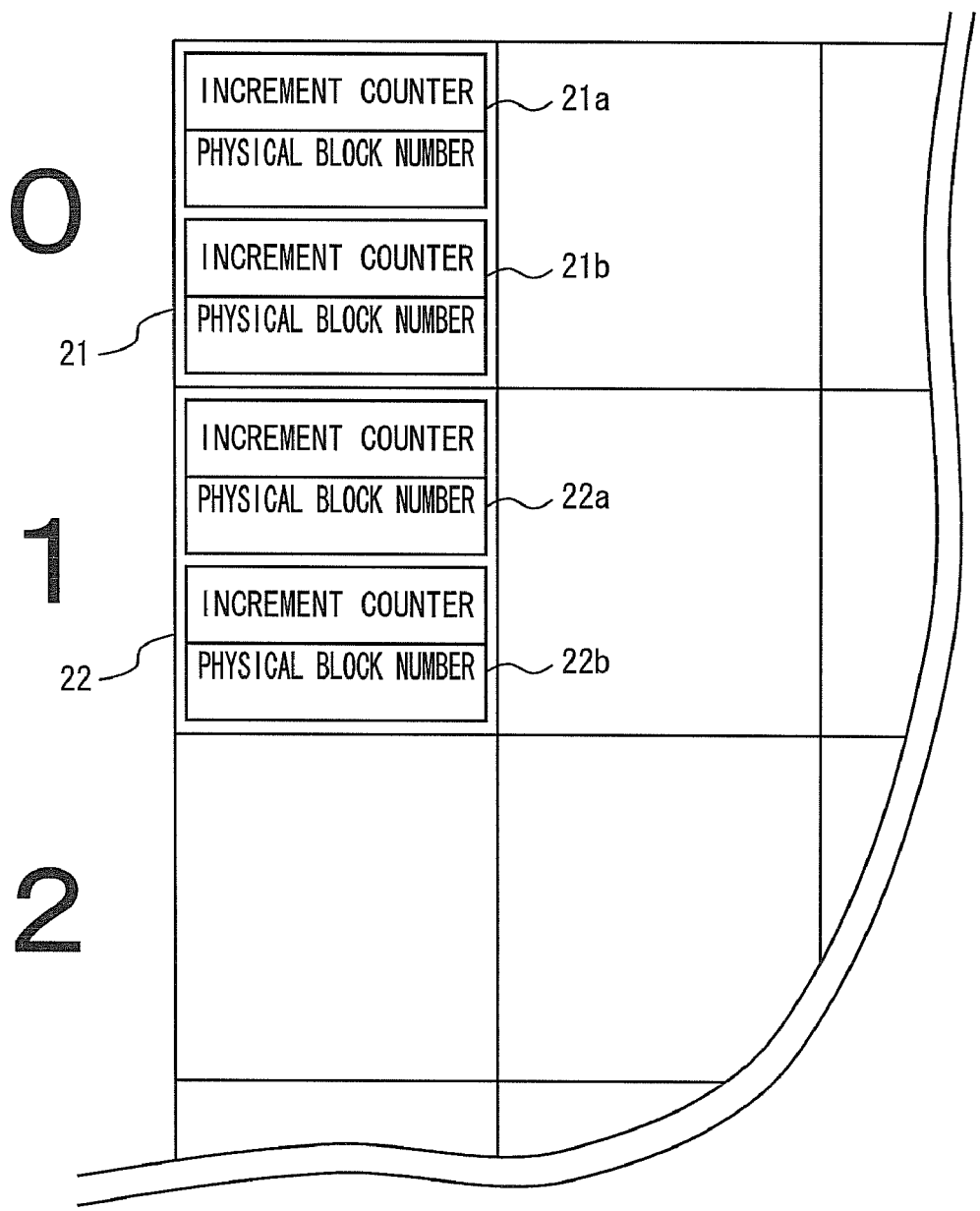
FIG. 16 illustrates the details and position of superblocks.

First of all, a description will be made about superblocks. The superblocks are used in pairs for identifying the latest block storing atomic data. An example of the superblocks is shown in FIG. 16. Like normal data, the superblocks are also stored in predetermined blocks on the hard disk 15. For the sake of clarity, assume that a pair of superblocks 21, 22 are stored in physical block number 0 and 1 on the hard disk 15, respectively.

The superblocks 21, 22 are placed in physical block number 0 and 1 on the hard disk 15, respectively. As shown in FIG. 16, the superblock 21 consists of two sub-blocks 21a, 21b each respectively including an increment counter and a physical block number of a block in which a block-number management table is placed. The superblock 22 is exactly alike. When data is closed with atomicity, the CPU 11 updates the block storing the atomic data while alternately incrementing the increment counters in the superblocks 21 and 22. Simultaneously, the same data is written in the sub-blocks 21a and 21b and 22a and 22b in sequence.

Because of this, if power failure occurs during the write operation, the data written in the superblocks 21a and 21b or 22a and 22b will be different. Therefore, the data written in the superblocks 21a and 21b or 22a and 22b apparently show which superblock in which the physical block number of the block number management table is written would contain the latest physical block number for managing atomic data.

Figure 6:
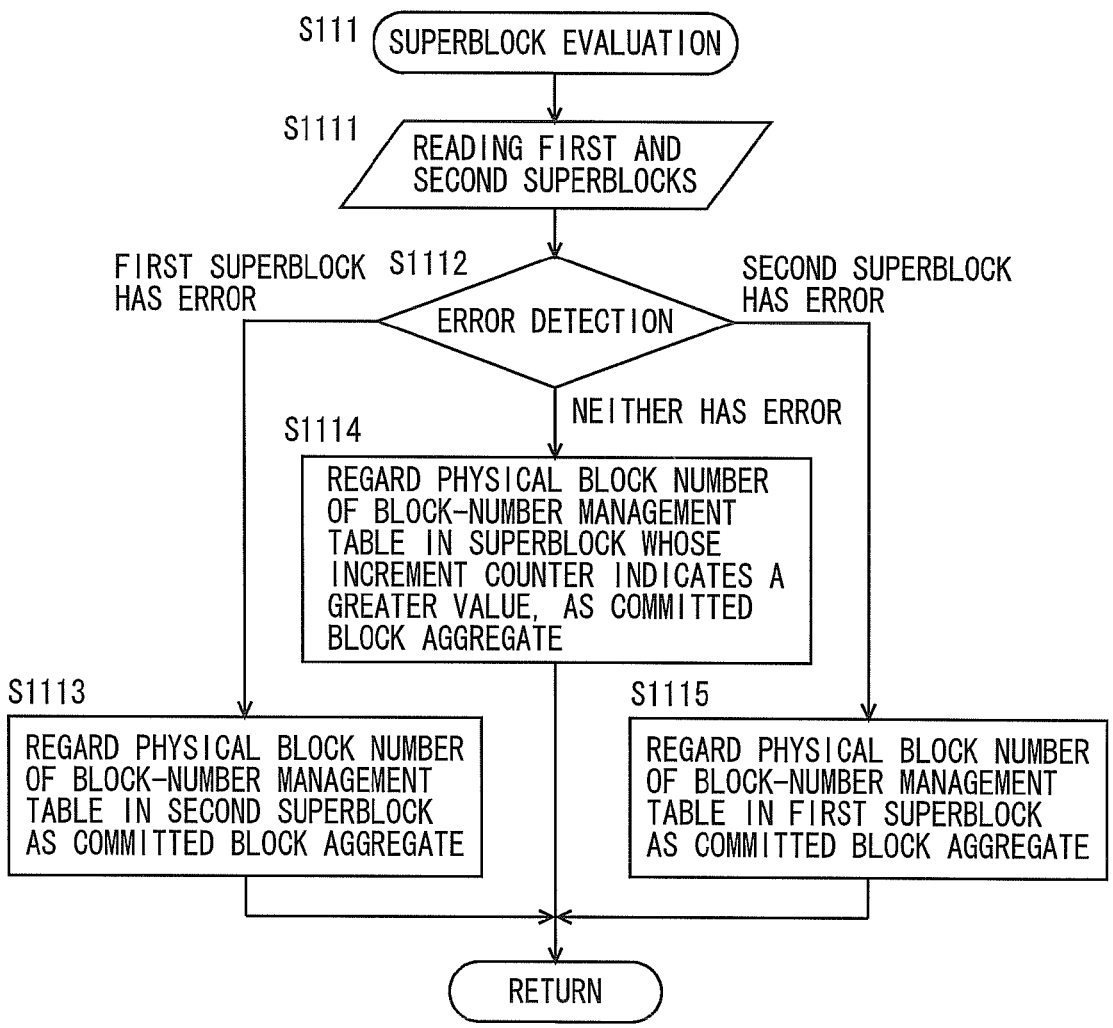
FIG. 6 is a flow chart showing the actual operations of a superblock evaluation process.

Detailed descriptions will be made about the evaluation process. FIG. 6 is a flow chart showing the actual operations in the superblock evaluation process. Referring to FIG. 6, the superblock evaluation process (S111) begins with reading first and second superblocks (S1111) and detection of errors (S1112). If the first superblock contains an error, the physical block number, which is a block number, in the second superblock is regarded as the number of the committed block aggregate (S1113). If the second superblock has an error, the physical block number in the first superblock is regarded as the block number of the committed block aggregate (S1115). If neither of the first and second superblocks has an error, the physical block number in the superblock whose increment counter indicates a greater value is regarded as the block number of the committed block aggregate (S1114). The superblock operates as block-position determination means.

The situation where errors are detected in both superblocks occurs only when the hard disk 15 is unformatted or when mechanical problems have developed.

Figure 7:
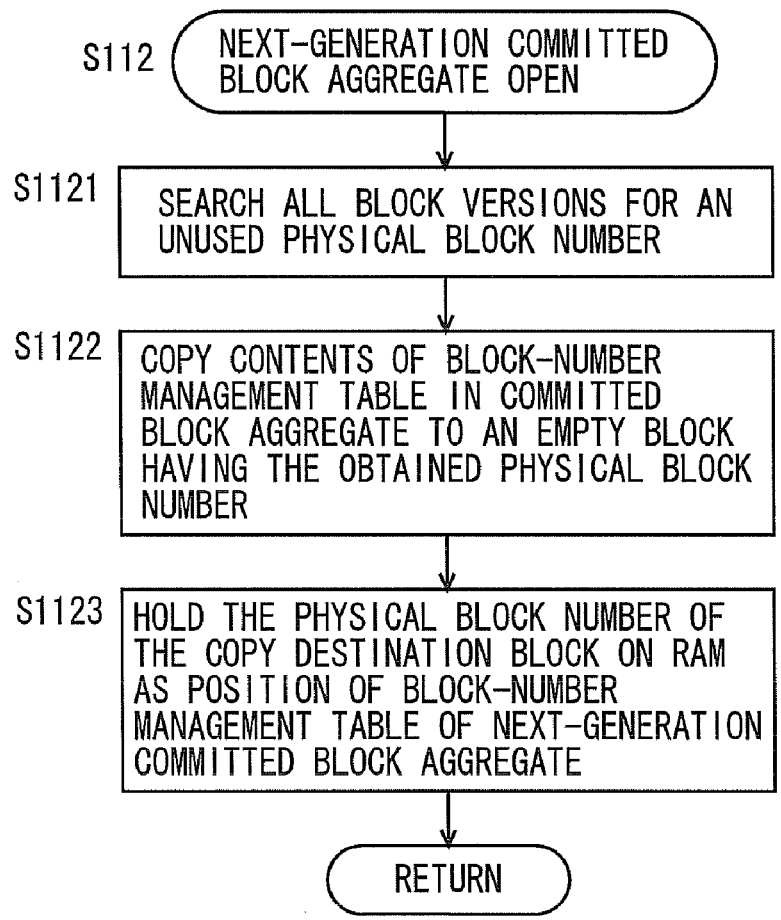
FIG. 7 is a flow chart showing an open process for a next-generation committed block aggregate. A flow chart shows a system termination process.

Next is a description regarding the open process of the next-generation committed block aggregate which is shown in S112 of FIG. 5. FIG. 7 is a flow chart showing the next-generation committed block aggregate open process. Referring to FIG. 7, the next-generation committed block aggregate open process (S112) begins with searching all block aggregates for an unused physical block number (S1121) and is followed by copying the contents of block-number management table in the committed block aggregate to the empty block of the obtained physical block number (S1122). The physical block number of the copy destination block is held on the RAM as a position of the block-number management table of the next-generation committed block aggregate (S1123).

The CPU 11 functions as first block formation means that forms next-generation committed block aggregate derived from the committed block aggregate.

In order to reduce the cost for searching for empty blocks, it is desirable to hold bitmaps, which are used to manage the number of blocks in use in the committed block aggregate, on the hard disk 15.

Figure 8:
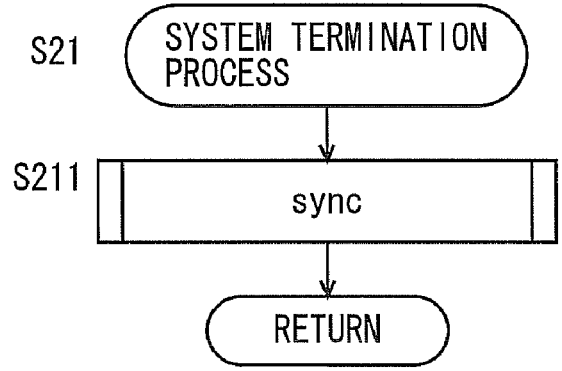
FIG. 8 is a flow chart showing a system termination process.

Next, a description will be made regarding the system termination process shown in S21 of FIG. 4. FIG. 8 is a flow chart showing the system termination process. Referring to FIG. 8, the system termination process includes a synchronous process ("sync", S211).

Figure 9:
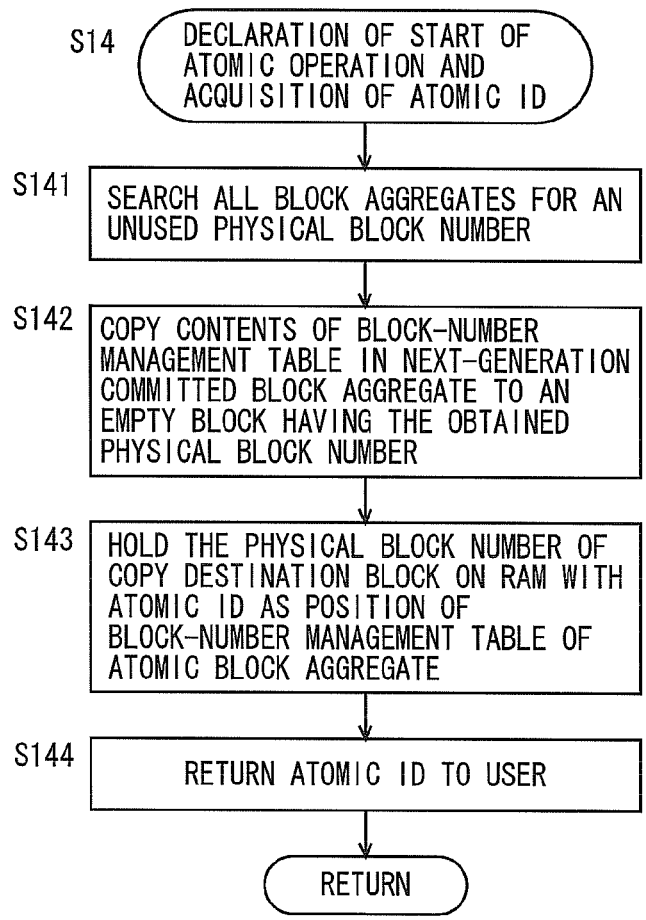
FIG. 9 is a flow chart showing a system of declaring start of an atomic operation and acquiring an atomic ID.

Next, a description will be made regarding a system for declaring start of an atomic operation and acquiring an atomic ID shown in S14 of FIG. 4. FIG. 9 is a flow chart showing a process of declaring the start of an atomic operation and acquiring an atomic ID. Referring to FIG. 9, the process of declaring start of an atomic operation and acquiring an atomic ID begins with searching all block aggregates for an unused physical block number (S141) and copying the contents of the block-number management table in the next-generation committed block aggregate to the empty block of the obtained physical block number (S142). The physical block number of the copy destination block is then held on the RAM with an atomic ID as a position of the block-number management table of the atomic block aggregate (S143). The atomic ID is returned to the user (S144). The CPU 11 functions as second block formation means that forms an atomic block aggregate derived from the next-generation committed block aggregate.

Figure 10:
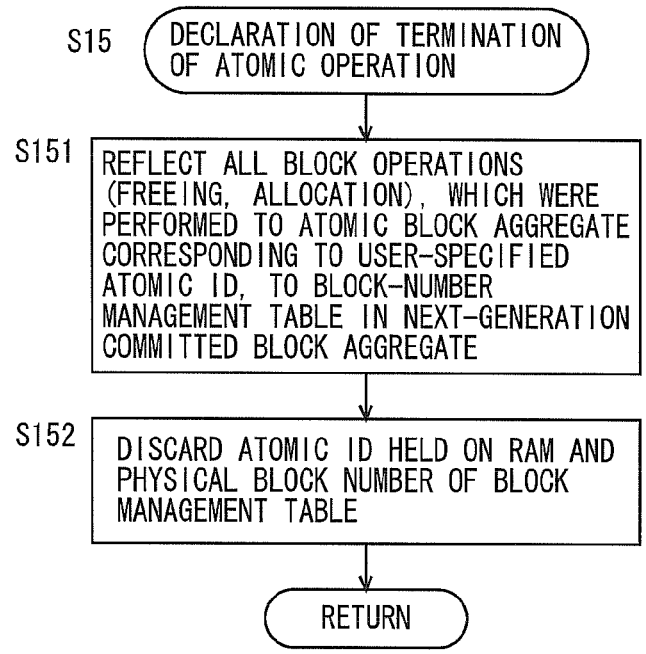
FIG. 10 is a flow chart showing a process of declaring termination of the atomic operation.

Following is a description regarding the declaration of termination of the atomic operation shown in S15 of FIG. 4. FIG. 10 is a flow chart showing the process of declaring the termination of the atomic operation. Referring to FIG. 10, the process of declaring the termination of the atomic operation begins with reflecting all block operations (freeing, allocation), which were performed to the atomic block aggregate corresponding to a user-specified atomic ID, to the block-number management table in the next-generation committed block aggregate (S151). Then, the atomic ID and the physical block number of the block management table, both held on the RAM, are discarded (S152). The CPU 11 functions as block operation acceptance means that accepts block operations for maintaining the atomicity that the user expects, on the atomic block aggregate.

Figure 11:
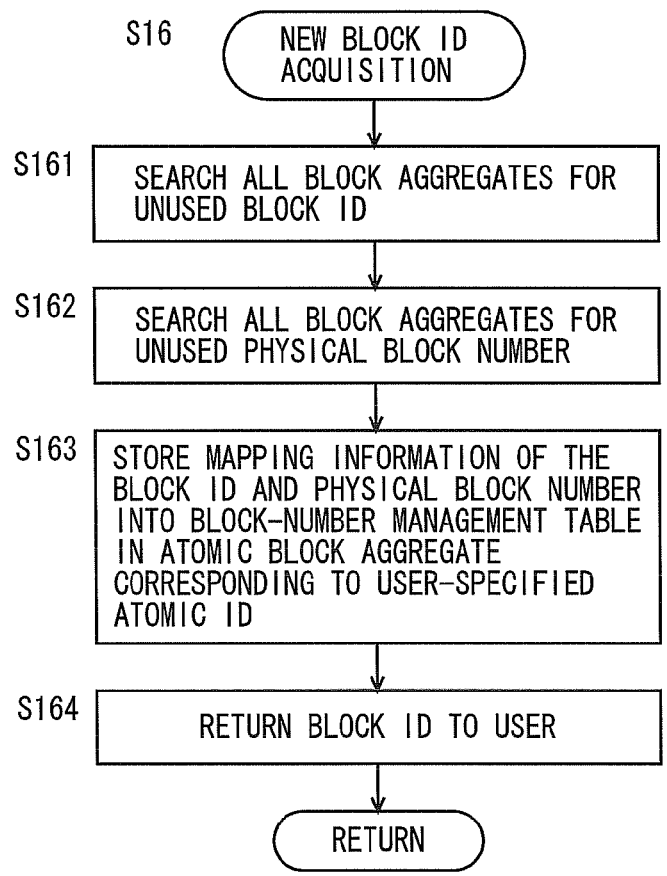
FIG. 11 is a flow chart showing the actual operations of a new block ID acquisition process.

Next, a description will be made regarding the process of acquiring a new block ID shown in S16 of FIG. 4. FIG. 11 is a flow chart showing the actual operations of the new block ID acquisition process. Referring to FIG. 11, the new block ID acquisition process begins with searching all block aggregates for an unused block ID (S161) and is followed by searching all block aggregates for an unused physical block number (S162), storing mapping information of the block ID and physical block number into the block-number management table in the atomic block aggregate corresponding to a user-specified atomic ID (S163), and returning the block ID to the user (S164).

Figure 12:
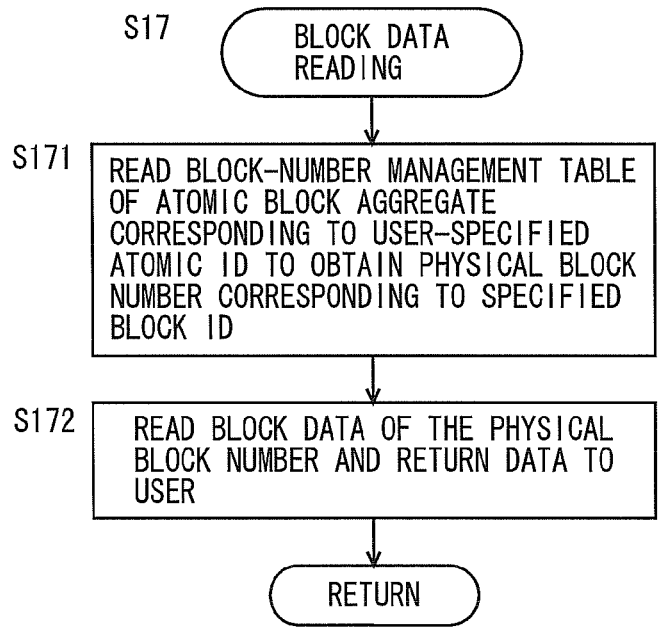
FIG. 12 is a flow chart showing the actual operations of a process of reading block data.

Next, a description will be made regarding the process of reading block data shown in S17 of FIG. 4. FIG. 12 is a flow chart showing the actual operations in the block data reading process. Referring to FIG. 12, the block data reading process begins with reading the block-number management table of the atomic block aggregate corresponding to a user-specified atomic ID to obtain the physical block number corresponding to a specified block ID (S171) and is followed by reading the block data of the physical block number and returning the data to the user (S172).

Figure 13:
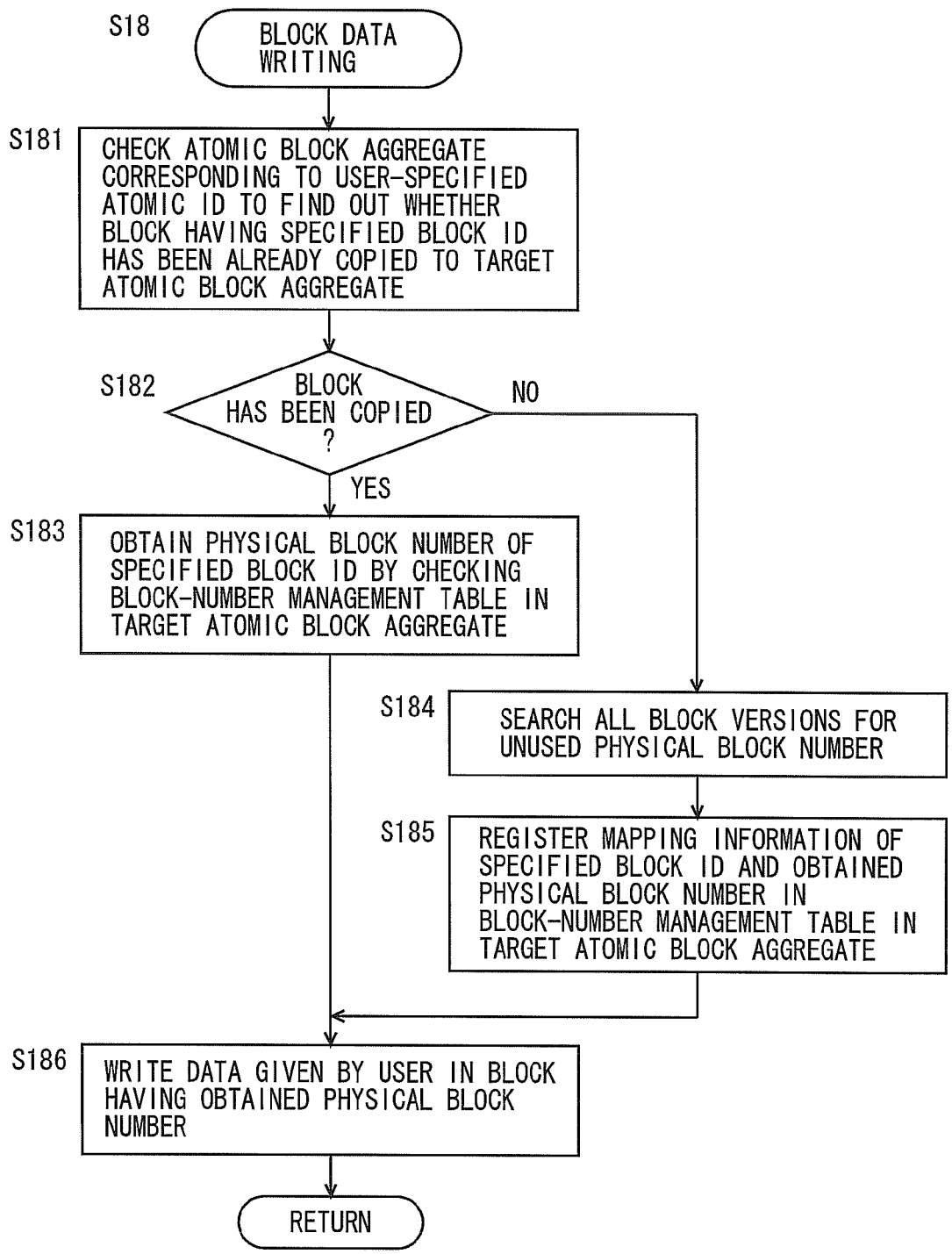
FIG. 13 is a flow chart showing the actual operations of a process of writing block data.

Next, the process of writing block data shown in S18 of FIG. 4 will be described. FIG. 13 is a flow chart showing the actual operations of the block data writing process. Referring to FIG. 13, the block data writing process includes checking the atomic block aggregate corresponding to a user-specified atomic ID to find out whether the block having the specified block ID has been already copied to the target atomic block aggregate (S181, S182). By checking the block-number management table in the target atomic block aggregate, the physical block number of the specified block ID is obtained (S183).

Then, data given by the user is written in the block having the obtained physical block number (186).

If the block is found not to have been copied yet in S182, all block aggregates are searched for an unused physical block number (S184). Mapping information of the specified block ID and the obtained physical block number are registered in the block-number management table in the target atomic block aggregate (S185). The process subsequently goes to S186.

Figure 14:
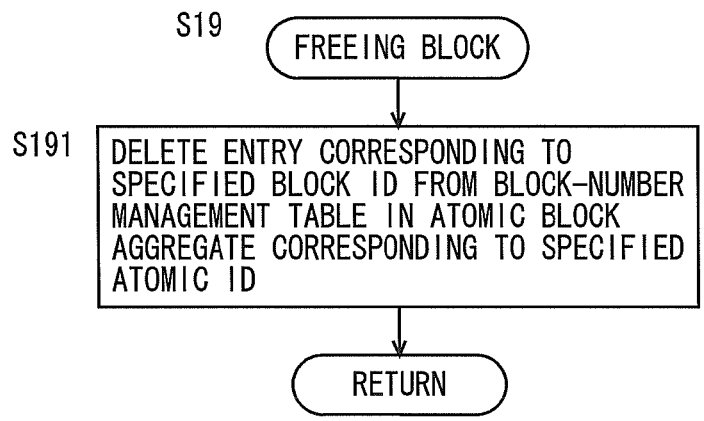
FIG. 14 is a flow chart showing the actual operations of a process of freeing blocks.

Next, the process of freeing blocks shown in S19 of FIG. 4 will be described. FIG. 14 is a flow chart showing the actual operations of the block freeing process. Referring to FIG. 14, in the block freeing process, an entry corresponding to the specified block ID is deleted from the block-number management table in the atomic block aggregate corresponding to the specified atomic ID (S191).

Figure 15:
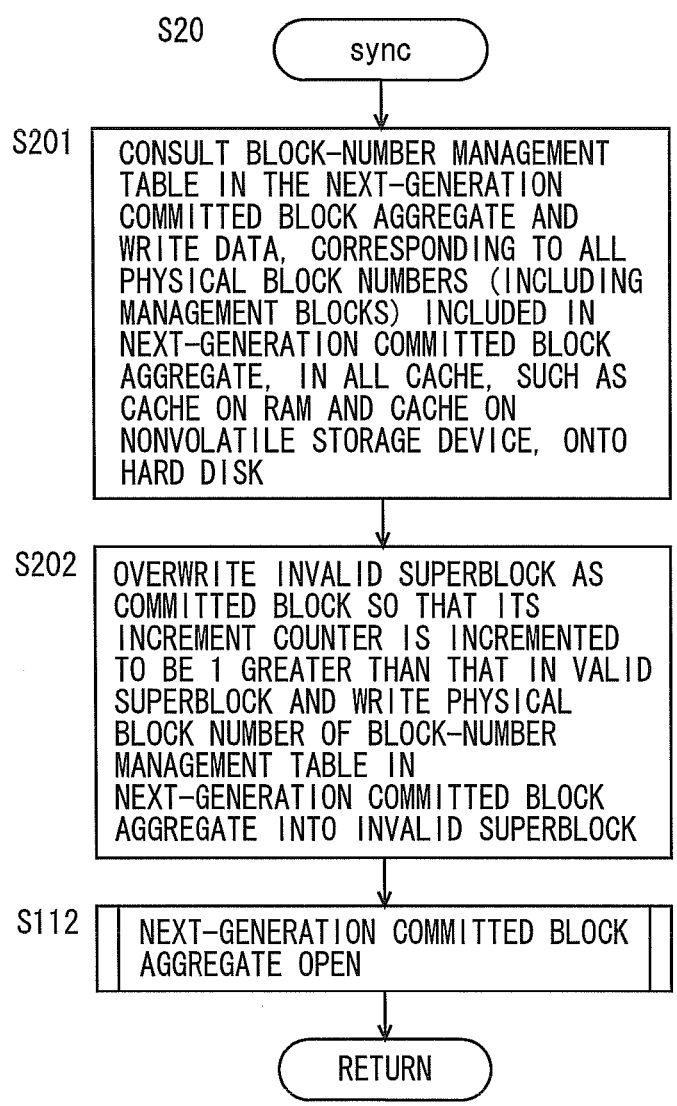
FIG. 15 is a flow chart showing the actual operations of a synchronous process.

Next, the synchronous process shown in S20 of FIG. 4 will be described. FIG. 15 is a flow chart showing the synchronous process. Referring to FIG. 15, when the user instructs termination of his/her data processing through the keyboard 14 or other devices, the system consults the block-number management table in the next-generation committed block aggregate and writes data, corresponding to all physical block numbers (including management blocks) included in the next-generation committed block aggregate, in all cache, such as cache on the RAM and cache on the hard disk 15, onto the hard disk 15 (S201).

This "synchronous process" may be an explicit "synchronous process" which is performed by a user after the user commanded to "declare the termination of an atomic operation" or a "synchronous process" which is automatically performed on a regular basis by the CPU 11. The former guarantees the user that the user's processing is reliably reflected to the committed block aggregate. The later commits the user block, which remains in the next-generation committed block aggregate due to lack of the "synchronous process" after the "declaration of termination of an atomic operation", to the committed block aggregate. The later process that is regularly performed by the CPU 11 eliminates involvement of the user and therefore enhances process efficiency as a whole. In this embodiment, either one of the synchronous processes selected by the user is to be performed.

A superblock, which is currently invalid as a committed block, is overwritten so that its increment counter is incremented to be 1 greater than that in the valid superblock, and the physical block number of the block-number management table in the next-generation committed block aggregate is also written into the invalid superblock (S202). Subsequently, the next-generation committed block aggregate open process as shown in FIG. 7 is performed. The CPU 11 functions as transition means that causes the atomic block aggregate to transit to the committed block aggregate with atomicity maintained when the operation acceptance means accepts the block operations from the user.

Figure 17:
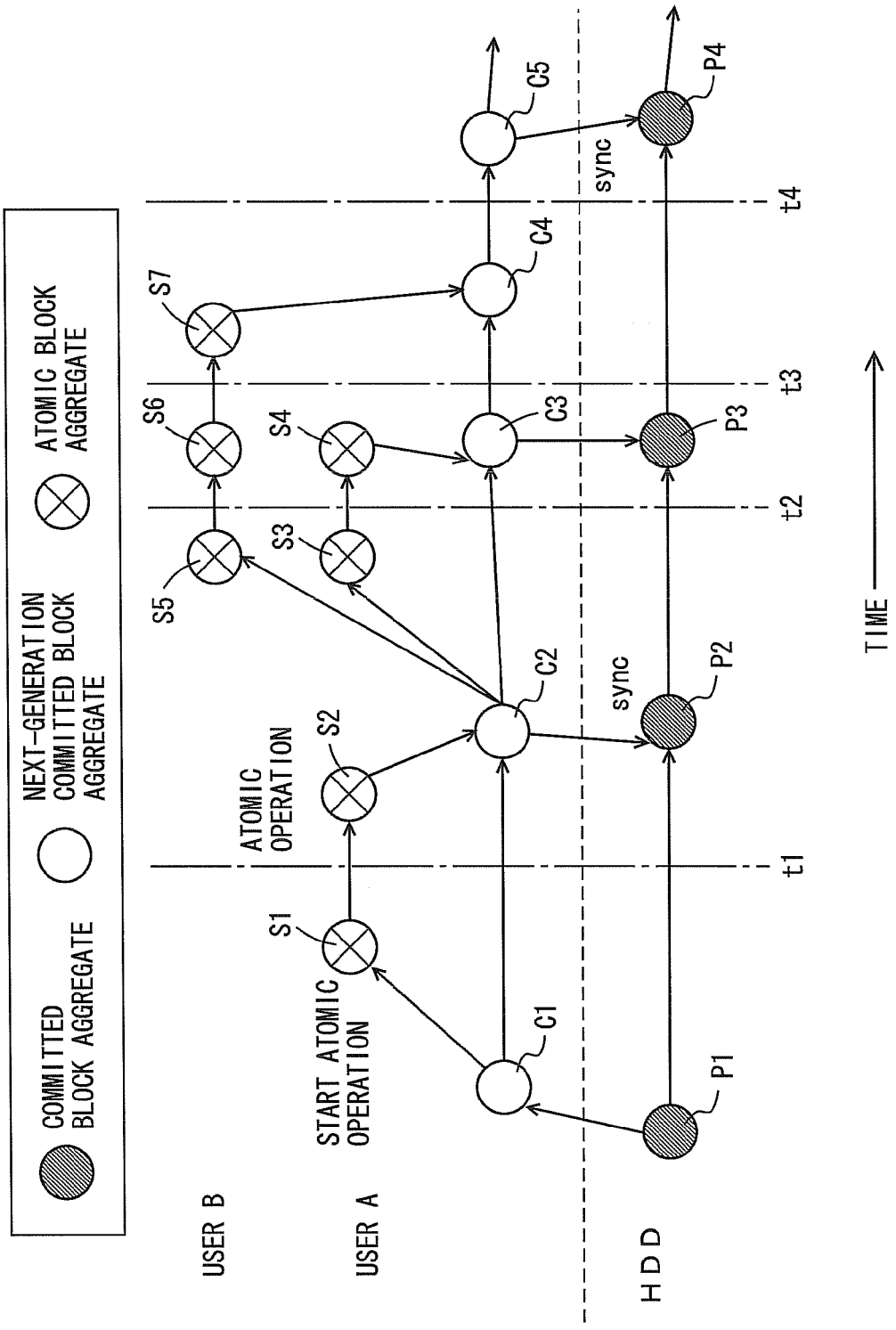
FIG. 17 illustrates the transitional states of block aggregates.

Next, the transition of the block aggregates will be specifically described. FIG. 17 illustrates the transitional states of the block aggregates. Among block aggregates shown in FIG. 17, block aggregates below the dotted line are the block aggregates existing on the hard disk 15 while block aggregates above the dotted line exist on a storage medium, such as the RAM, other than the hard disk 15. As described above, the committed block aggregates exist only on the hard disk 15. The evaluation of superblocks during the system initialization process identifies a committed block aggregate P1 having atomicity on the hard disk 15. The next-generation committed block aggregate open process during the system initialization process creates a next-generation committed block aggregate C1 from the committed block aggregate P1.

If user A declares start of an atomic operation, an atomic block aggregate S1 is created and then an atomic block aggregate S2 is created through processes of acquiring a new block ID, reading and writing block data, and freeing blocks. If the user terminates data processing and declares termination of the atomic operation, a next-generation committed block aggregate C2 is created. Then, the next-generation committed block aggregate C2 makes transition to a committed block P2 to be stored on the hard disk 15 by undergoing the synchronous process (sync) explicitly specified by the user or the synchronous processing (sync) performed on a regular basis by the CPU 11.

With reference to FIGS. 17 to 23, descriptions will be made regarding transition of block aggregates when users A and B perform data processing and specific relationship between a block ID and an atomic ID in such a situation. The atomic ID in the descriptions is an identification number for allowing the users A and B to identify their own atomic block aggregates shown in FIG. 19 which will be described later.

Assume that data in the committed block aggregate P2 shown in FIG. 17 is atomically processed by user A and user B. FIG. 18 specifically illustrates superblocks, a committed block aggregate and next-generation committed block aggregate immediately after system initialization. In FIG. 18, the physical block number is represented as PB0, PB1, . . . , while the block ID as ID0, ID1, . . . . Assume that the superblocks PB0 and PB1 have values as shown in FIG. 18. The CPU 11 determines that the superblock having the latest committed block aggregate is PB0 by referring to the values of the increment counters in the superblocks PB0 and PB1 and therefore uses block-number management table PB2. The management table in PB2 of the committed block aggregate has contents as indicated by reference number 51. The table 51 stores physical block numbers PB3, PB4, PB5 associated with blocks ID0, ID1, ID2, respectively. FIG. 18 shows which of the physical blocks PB3 to PB5 contains which user's data block, in addition to the respective block IDs.

When the CPU 11 creates the next-generation committed block aggregate C2 from this state, the CPU 11 creates a block-number management table 52 of the next-generation committed block aggregate by copying the block-number management table 51 of the committed block aggregate to an unused physical block, i.e., a physical block PB6.

Figure 19:
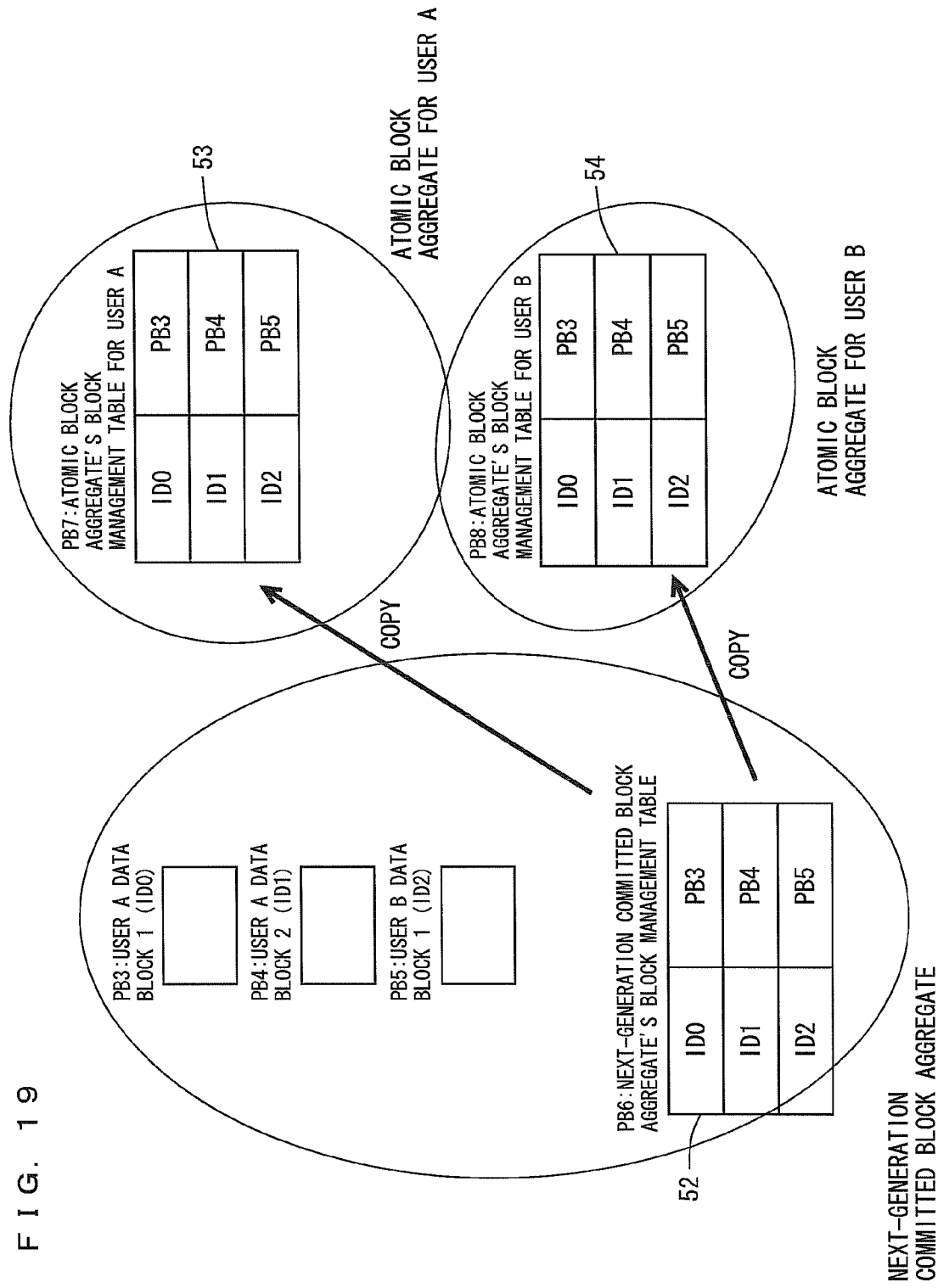
FIG. 19 illustrates, in transition of the block aggregates, an exemplary transition with specific physical block numbers.

In conjunction with an instruction from user A to change its own data, an atomic block aggregate S3 is created. Then, as shown in FIG. 19, an atomic block aggregate's block-number management table 53 is created for user A who copied the next-generation committed block aggregate's block-number management table 52. The atomic block aggregate's management table 53 is also created in an unused physical block PB7.

On the other hand, with an instruction from user B to change his/her own data, an atomic block aggregate S5 is created. Then, as shown in FIG. 19, an atomic block aggregate's block-number management table 54 is created for user B who copied the next-generation committed block aggregate's block-number management table 52. This atomic block aggregate's management table 54 is also created in an unused physical block PB8.

Figure 20:
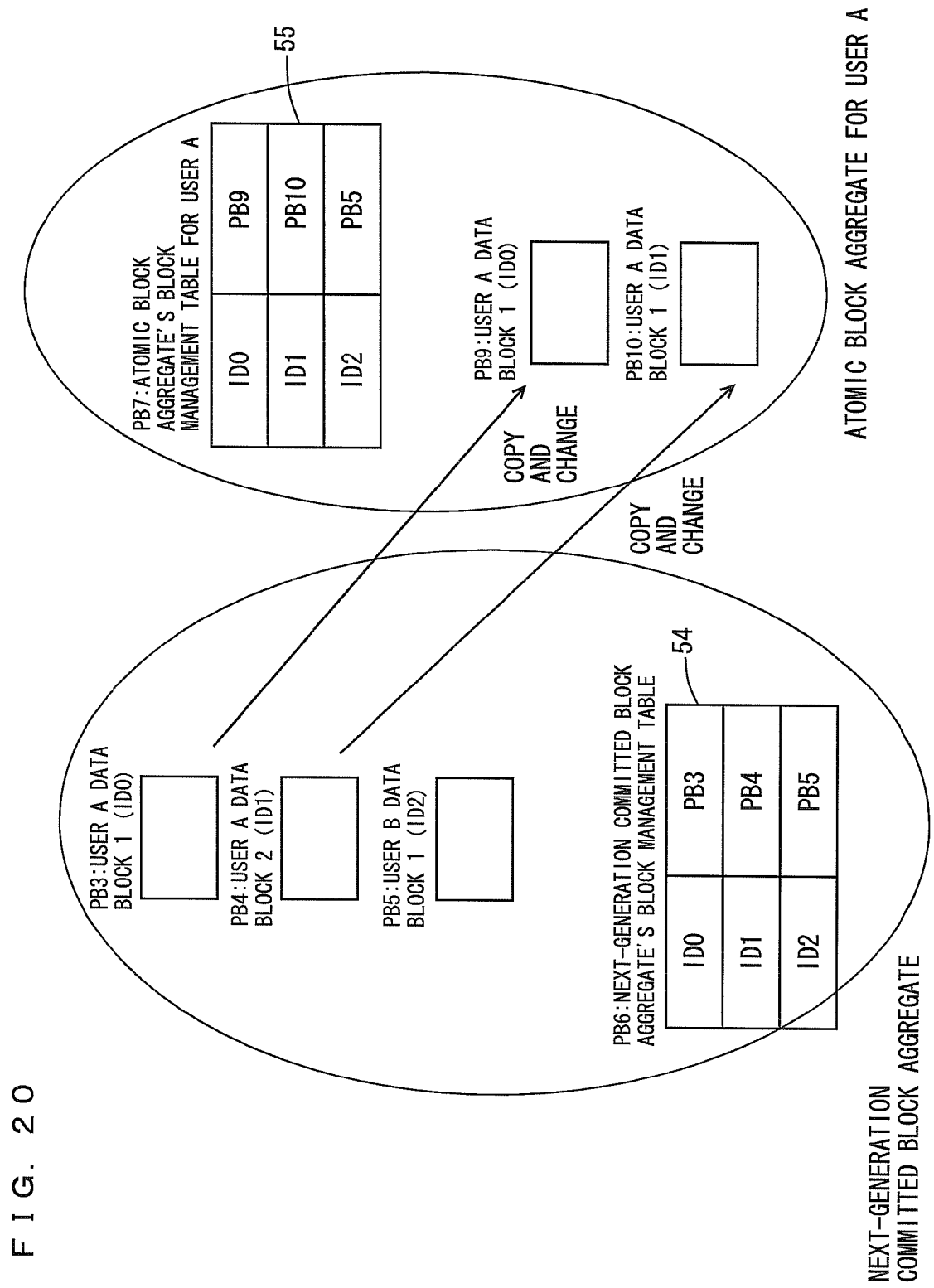
FIG. 20 illustrates, in transition of the block aggregates, an exemplary transition with specific physical block numbers.

The next-generation committed block aggregate and atomic block aggregate immediately after user A made changes to the block ID0 and block ID1 are shown in FIG. 20 in detail. User A copies the data in the physical blocks PB3 and PB4 to physical blocks PB9 and PB10 to make changes. Consequently, the atomic block aggregate management table 53 for user A is changed to an atomic block aggregate management table 55 that is then stored in a physical block PB7.

Figure 21:
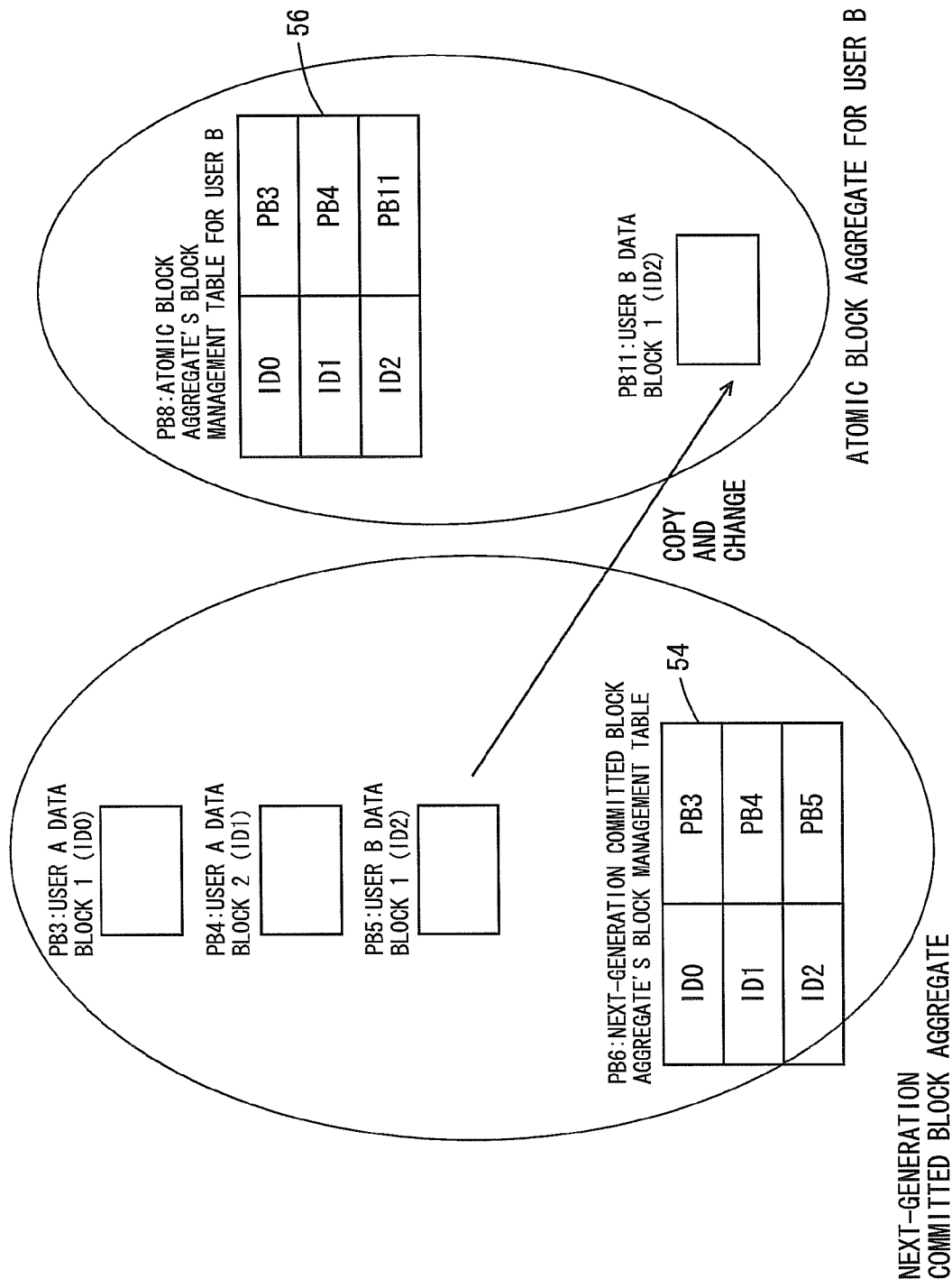
FIG. 21 illustrates, in transition of the block aggregates, an exemplary transition with specific physical block numbers.

The next-generation committed block aggregate and atomic block aggregate immediately after user B made changes to block ID 2 are shown in FIG. 21 in detail. User B copies the data in the physical block PB5 to a physical block PB11 to make changes. Consequently, the atomic block aggregate management table 54 for user B is changed to an atomic block aggregate management table 56 that is then stored in a physical block PB8.

Figure 22:
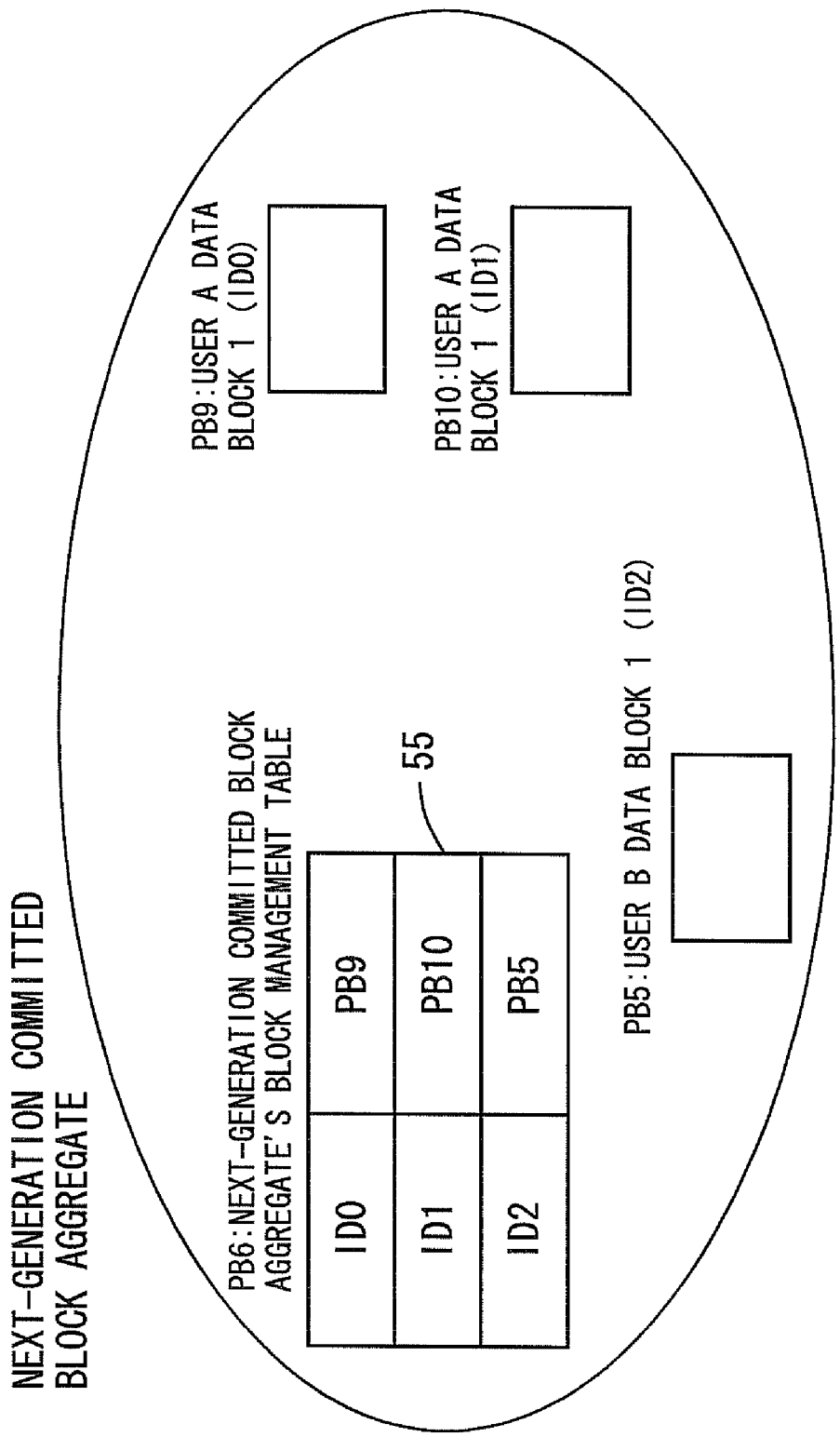
FIG. 22 illustrates, in transition of the block aggregates, an exemplary transition with specific physical block numbers.

If user A declares termination of the atomic operation after having performed the above-described data processing, a next-generation committed block aggregate C3 is created. The next-generation committed block aggregate immediately after user A declared termination of the atomic operation is shown in FIG. 22 in detail. In the drawing, the next-generation committed block aggregate C3 includes a next-generation committed block aggregate's block-number management table, data blocks 1, 2 of user A and a data block 1 of user B, which are enclosed by an ellipse. Reference number 55 indicates a next-generation committed block aggregate's block-number management table stored in a physical block PB6.

Performing synchronous processing creates a committed block aggregate P3. FIG. 23 illustrates superblocks and a committed block aggregate during the synchronous process in detail. As shown in FIG. 23, the next-generation committed block aggregate makes transition to the committed block aggregate without any changes. The superblock 2 increments its increment counter so as to be 11, which is one greater than the increment counter of the superblock 1, and then sets the physical block number PB6, which is a block storing the definitively committed block aggregate's block-number management table, as a physical block number of the block-number management table.

Thus, in the aforementioned embodiment, data changes or the like are always made by making a new copy of the data to a block having an unused block number and storing the positional information of the block into a block-number management table upon termination of the atomic operation, thereby storing the data in the committed block aggregate onto the hard disk by referring to the block number. In addition, the original data is reliably protected without exception whenever power is shut down.

Note that blocks, to which any change is not made, in each block aggregate are shared by the block aggregates.

Next is a description regarding the state of the hard disk 15 when the system is powered down while a user is performing data processing. FIG. 17 showing the transition of block aggregates explains what happens at each time t1, t2, t3 and t4 of power failure.

(1) Power Failure at Time t1

Referring to FIG. 17, the power failure of time t1 occurs when the next-generation committed block aggregate C1 is created after initialization of the data storage system and a user starts data processing with the atomic block aggregate S1.

In this case, there is only the committed block aggregate P1 committed on the hard disk 15 and no data has not been written into the committed block aggregate since then. Therefore, the increment counters and the block numbers in the superblocks stay the same.

Accordingly, the system rebooted from such a situation uses the same data of the superblock committed in the committed block aggregate P1.

(2) Power Failure at Time t2

The power failure occurs while user A is recording data with the use of the atomic block aggregate S3 and another user B is recording data with the use of the atomic block aggregate S5. In this case, a committed block aggregate P2 created upon synchronous process that is automatically performed by the CPU 11 is recorded on the hard disk 15.

Accordingly, the system rebooted from such a situation uses the data of the superblock committed in the committed block aggregate P2.

(3) Power Failure at Time t3

The power failure occurs when user A finishes atomic data processing with the atomic block aggregate S4, merges the non-processed block with the next-generation committed block aggregate C3 by declaring termination of the atomic operation and causes the aggregate C3 to transit to the committed block aggregate P3 by a synchronous process that is performed explicitly by the user or automatically performed by the system, while user B is performing processing to the atomic block aggregate S6. In this case, the data of user A is committed by synchronous processing as the committed block aggregate P3 on the hard disk. However, user B who has not performed such processing loses the atomic block aggregate S6.

The system rebooted from such a situation uses the data of the superblock committed in the committed block aggregate P3.

(4) Power Failure at Time t4

The power failure occurs when user B finishes data processing. The system rebooted from such a situation uses the data of the superblock committed in the committed block aggregate P3.

As described above, in this embodiment, even if power is suddenly shut down while a plurality of users are performing their own data processing, the system can be initialized at next power-on to return to its normal state. Since the users can store their data on the hard disk 15 as a committed block aggregate at any time desired by the users, the data can maintain its atomicity, which is expected by the plurality of users each concurrently performing data processing and is not affected by another user's operation at power failure.

Users who do not hasten to commit the data do not need to explicitly perform the synchronous process but can leave the system-driven regular synchronous process to improve performance of the whole system.

Although a hard disk is used as a nonvolatile storage medium in the aforementioned embodiment, the present invention is not limited thereto and can be applied to any nonvolatile storage media including flash memory.

Although a pair of superblocks are used to detect a block holding atomic data in the aforementioned embodiment, the present invention is not limited thereto and can adopt any mechanism as long as the mechanism can ensure that data has been written in a block on a hard disk and write operations to the block have been completed (e.g., calculating a checksum of all data).

In addition, the data storage system in the embodiment is accessible by a plurality of users. The plurality of users can be a plurality of programs stored on a hard disk, the programs being read out to a RAM to be concurrently processed by a CPU.

Furthermore, the block-number management table in each block aggregate is supposed to fit in a single block in the embodiment; however, if the block-number management table cannot fit in a single block, the block-number management table can be readily expanded by creating it across a plurality of blocks and managing it in a tree structure.

The foregoing has described the embodiment of the present invention by referring to the drawings. However, the invention should not be limited to the illustrated embodiment. It should be appreciated that various modifications and changes can be made to the illustrated embodiment within the scope of the appended claims and their equivalents.

INDUSTRIAL APPLICABILITY

The data storage system according to the present invention that enables atomic transactions and prevents data of a user from being affected by data processing by other users can be advantageously used as a data storage system used for nonvolatile storage media.

The invention claimed is:

1. A data storage system for a nonvolatile storage medium storing data accessible by a plurality of users, the non-volatile storage medium comprising:
    predetermined blocks in which said data are held, such that while one of the users is processing a predetermined block, the other users cannot process said predetermined block, wherein
    said predetermined blocks include separately provided committed blocks, next-generation committed blocks and atomic blocks,
    said committed blocks, next-generation committed blocks and atomic blocks are grouped into a committed block aggregate, a next-generation committed block aggregate and an atomic block aggregate, respectively, each of the aggregates being a collection of blocks, and
    said committed block aggregate exists only on said nonvolatile storage medium, said data storage system comprising:
    at least one processor, and
    at least one memory including computer program code configured to, with the at least one processor, cause the data storage system to perform at least the following:
    form said next-generation committed block aggregate from said committed block aggregate by copying some blocks of said committed block aggregate, said next-generation committed block aggregate being able to exist across said nonvolatile storage medium and another storage medium;
    form said atomic block aggregate, for every user, from said next-generation committed block by copying some blocks of said next-generation committed block aggregate, said atomic block aggregate being able to exist across said nonvolatile storage medium and another storage medium;
    perform operations on said atomic block aggregate, the operations causing at least some blocks in the atomic block aggregates to be revised;
    merge the atomic block aggregate into said next-generation committed block aggregate after performing operations on the atomic block aggregates while maintaining atomicity for every user by replacing the blocks revised by said operations on said atomic block aggregates with blocks in said next-generation committed block aggregate that have not been revised; and
    transferring data within said merged atomic block aggregate/next-generation committed block aggregate to said committed block aggregate while maintaining the atomicity by writing all blocks existing in said merged atomic block aggregate/next-generation committed block aggregate but not on said nonvolatile storage medium onto said nonvolatile storage medium.

2. The data storage system according to claim 1, wherein the at least one processor further causes the data storage system to merge an atomic block aggregate or a plurality of concurrently existing atomic block aggregates to the next-generation committed block aggregate at any time.

3. The data storage system according to claim 1, wherein the at least one processor further causes the data storage system to determine
the location of the committed block aggregate storing atomic data.

4. The data storage system according to claim 3, wherein the location of the committed block aggregate storing atomic data is determined by
a pair of superblocks, each including a block number for identifying block aggregates holding atomic data and an increment counter, and
every time atomic data is written in a new block aggregate, one of said pair of block numbers and the value of the increment counter being ae updated in sequence.

5. The data storage system according to claim 4, wherein each of said superblocks includes a set of a block number and an increment counter, the block number being used to identify block aggregates holding atomic data, and
the same data is stored in said set of the block number, which is used to identify block aggregates holding atomic data, and the increment counter.

6. The data storage system according to claim 1, wherein each block in said block aggregates includes a block-number management table that stores the relationship between the physical block numbers storing data and block IDs.

7. The data storage system according to claim 1, wherein said committed block aggregate, next-generation committed block aggregate and atomic block aggregate, each includes a user data block storing changeable data for every user and a block-number management table managing said user data block.

8. A data storage program enabling a computer to operate as a data storage system for a nonvolatile storage medium storing data accessible by a plurality of users, wherein the nonvolatile storage medium comprises:
predetermined blocks for holding the data, such that while one of the users is processing a predetermined block, the other users cannot process said predetermined block,
said predetermined blocks include separately provided committed blocks, next-generation committed blocks and atomic blocks,
said committed blocks, next-generation committed blocks and atomic blocks are grouped into a committed block aggregate, a next-generation committed block aggregate and an atomic block aggregate, respectively, each of the aggregates being a collection of blocks, and
said committed block aggregate exists only on said nonvolatile storage medium,
said program being stored in a memory and being operable with at least one processor in the computer to cause the data storage system to perform the following:
forming said next-generation committed block aggregate from said committed block aggregate by copying some blocks of said committed block aggregate, said next-generation committed block aggregate being able to exist across said nonvolatile storage medium and another storage medium;
forming said atomic block aggregate, for every user, from said next-generation committed block by copying some blocks of said next-generation committed block aggregate, said atomic block aggregate being able to exist across said nonvolatile storage medium and another storage medium;
performing operations on atomic block aggregates, the operations causing at least some blocks in the atomic block aggregates to be revised;
merging the atomic block aggregate into said next-generation committed block aggregate after performing operations on the atomic block aggregates while maintaining atomicity for every user by replacing the blocks revised by said operations performed on said atomic block aggregates with blocks in said next-generation committed block aggregate that have not been revised; and
transferring data within said merged atomic block aggregate/next-generation committed block aggregate to said committed block aggregate while maintaining the atomicity by writing all blocks existing in said merged atomic block aggregate/next-generation committed block aggregate but not on said nonvolatile storage medium onto said nonvolatile storage medium.

\* \* \* \* \*